(12) United States Patent
Reiber (10) Patent No.: US 9,150,158 B2
(45) Date of Patent: Oct. 6, 2015

(54) VENTILATED VEHICLE ROOF RACK CARRIER

(71) Applicant: Braden A. Reiber, Boynton Beach, FL (US)

(72) Inventor: Braden A. Reiber, Boynton Beach, FL (US)

(*) Notice: Subject to any disclaimer, the term of this patent is extended or adjusted under 35 U.S.C. 154(b) by 0 days.

(21) Appl. No.: 13/998,182

(22) Filed: Oct. 9, 2013

(65) Prior Publication Data

US 2014/0097219 A1     Apr. 10, 2014

Related U.S. Application Data

(60) Provisional application No. 61/795,099, filed on Oct. 10, 2012.

(51) Int. Cl.
| | |
|---|---|
| *B60R 9/042* | (2006.01) |
| *B60R 9/055* | (2006.01) |
| *E06B 7/02* | (2006.01) |
| *E06B 7/082* | (2006.01) |

(52) U.S. Cl.
CPC .................. *B60R 9/042* (2013.01); *B60R 9/055* (2013.01); *E06B 7/02* (2013.01); *E06B 7/082* (2013.01)

(58) Field of Classification Search
CPC ................................ B60R 9/042; B60R 9/055
USPC .......... 224/310, 328, 281; D12/413; 414/462; 296/26.09
See application file for complete search history.

(56) References Cited

U.S. PATENT DOCUMENTS

| | | | | | |
|---|---|---|---|---|---|
| 1,939,312 | A | * | 12/1933 | Murray | 454/195 |
| 3,809,425 | A | * | 5/1974 | Blaschke | 296/22 |
| 4,793,535 | A | * | 12/1988 | Johnson | 224/329 |
| 5,535,929 | A | * | 7/1996 | Neill | 224/310 |
| 5,673,831 | A | * | 10/1997 | Spratt | 224/310 |
| 6,428,263 | B1 | * | 8/2002 | Schellens | 414/462 |
| 6,681,970 | B2 | * | 1/2004 | Byrnes | 224/310 |
| 6,761,296 | B2 | * | 7/2004 | Ford et al. | 224/310 |
| 6,827,244 | B1 | * | 12/2004 | Stapleton et al. | 224/310 |
| 6,976,720 | B1 | * | 12/2005 | Bequette | 296/26.09 |
| 7,108,162 | B2 | * | 9/2006 | Stadler et al. | 224/310 |
| 7,189,158 | B2 | * | 3/2007 | Motszko et al. | 454/143 |
| 7,490,578 | B1 | * | 2/2009 | Mottard | 119/161 |
| 7,695,049 | B2 | * | 4/2010 | Colborne | 296/161 |
| 8,282,254 | B2 | * | 10/2012 | Sautter et al. | 362/496 |
| 8,851,346 | B2 | * | 10/2014 | Fritsche et al. | 224/324 |

(Continued)

FOREIGN PATENT DOCUMENTS

| | | | | |
|---|---|---|---|---|
| GB | | 2407306 A | * | 4/2005 |
| WO | WO 2010082898 A1 | | * | 7/2010 |

*Primary Examiner* — Justin Larson
(74) *Attorney, Agent, or Firm* — Caroline M. Nash (57) ABSTRACT

The invention is a ventilated vehicle roof rack carrier such as a cargo box for transporting items such as athletic equipment or other personal items on top of a car. The cargo box has a rigid housing shell. The housing has a top shell and a bottom shell. The top shell and the bottom shell are connected together by one or more hinges. The top shell further has at least two opposing vents for drawing air into the housing shell body and allowing air to exit the housing shell body. The cargo box also has a means in communication with the housing for attaching the housing to the vehicle. The means for attaching is a rail system with engagement means for attaching the rail system to the vehicle. The rail system further has a first articulating rail and a second articulating rail oriented in parallel relationship to each other. The pair of articulating rails are mounted to the lower shell and permit the housing to slide beyond a top surface of the vehicle and hinge downward relative to the top surface of the vehicle.

17 Claims, 10 Drawing Sheets

(56) References Cited

U.S. PATENT DOCUMENTS

| | | | |
|---|---|---|---|
| 2004/0149793 A1* | 8/2004 | Theodore | 224/576 |
| 2005/0194414 A1* | 9/2005 | Lynch | 224/401 |
| 2006/0133914 A1* | 6/2006 | Derks | 414/462 |
| 2006/0175368 A1* | 8/2006 | Fallis et al. | 224/310 |
| 2007/0205240 A1* | 9/2007 | Castro et al. | 224/328 |
| 2009/0295197 A1* | 12/2009 | Zabel et al. | 296/208 |
| 2009/0308902 A1* | 12/2009 | Rex | 224/315 |

\* cited by examiner

VENTILATED VEHICLE ROOF RACK CARRIER

This is a non-provisional application claiming priority under 35 USC 119(e) of provisional application Ser. No. 61/795,099, filed Oct. 10, 2012.

BACKGROUND OF THE INVENTION

1. Field of the Invention

The invention relates an exterior mounted vehicle roof rack cargo box device.

2. Brief Description of Related Art

Vehicle cargo box systems allow for storage and transport of items outside of the vehicle interior. These cargo boxes are typically mounted in a fixed position to the vehicle's roof by an apparatus designed to secure the cargo box from the rigors of driving. More specifically, hard-shelled cargo boxes protect their contents from the elements and from theft by employing a durable shell, equipped with seals between the cargo box's two halves, as well as by a locking system that prevents undesired entry.

SUMMARY OF THE INVENTION

The cargo box of the present invention has a housing shell body and a rail system. The housing shell body is divided into two halves, an top shell half and bottom shell half. The top shell half is ventilated to allow drying of internally stowed items. Systems of control surfaces that may be automated are attached to each vented opening, the purpose of which is, block external moisture such as rain from entering the interior of the cargo box's housing. A railing system is provided for attaching the housing shell body to the vehicle. The railing system allows the housing shell body to roll into various positions relative to the top of the vehicle and also allows the housing shell body to move downward off the rear (or front) of the vehicle it is attached to, via a set of spring loaded hinges. Internally, the housing shell body has compartments and fasteners used to secure any stowed items, as well as a set of UVC lights that disinfect the stowed items.

DETAILED DESCRIPTION

Figure 1:
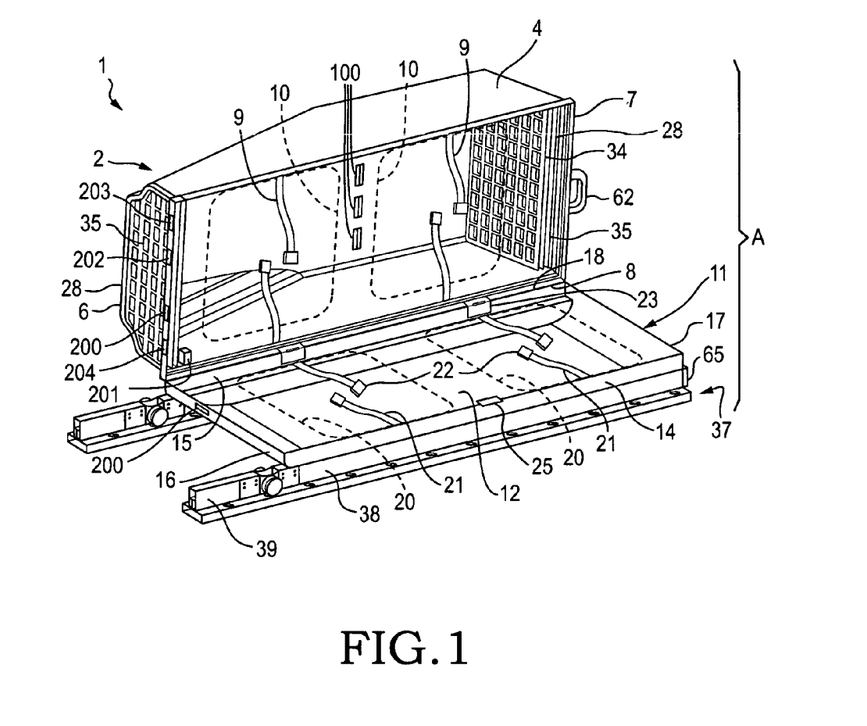
FIG. 1 is a perspective view of the Cargo Box of the invention.
Figure 2A:
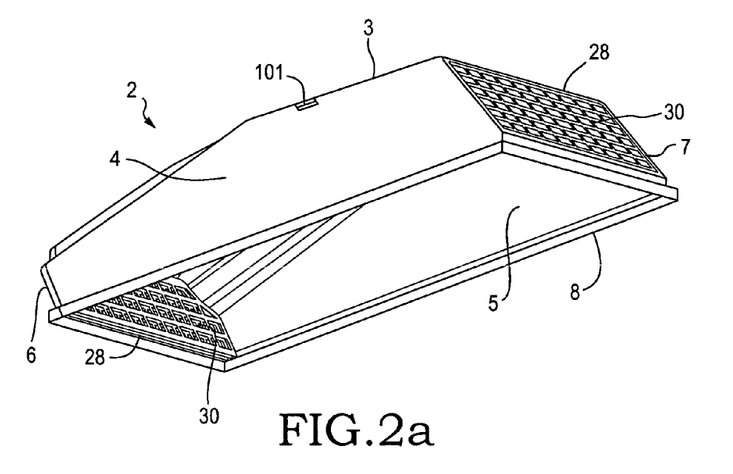
FIG. 2a is a perspective view of the top shell half showing the inside thereof.
Figure 2B:
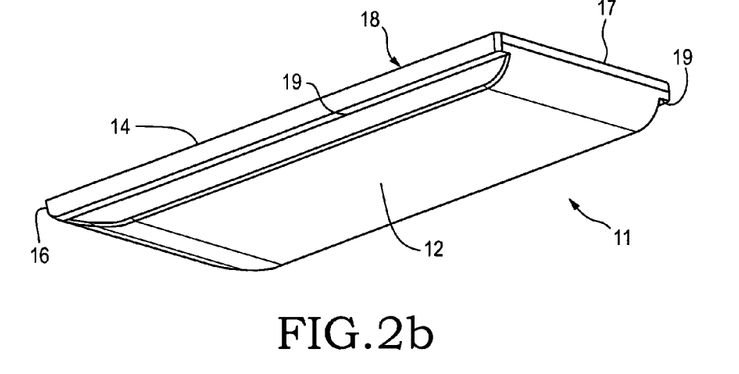
FIG. 2b is a bottom perspective view of the bottom shell half.

The invention is a ventilated vehicle roof rack cargo box A. Referring to FIGS. 1 and 2a-2b, the housing shell body 1 of the cargo box is a ridged, durable housing shell that holds a desired load or cargo. The main housing shell 1 is made up of two independent shell halves, i.e. a top shell half 2 and a bottom shell half 11.

The two shell halves are attached to one another by a set of hinges 23 located along juxtaposing edges of the bottom edge rim 8 of the upper shell half 2 and the upper edge rim 18 of the bottom shell half 11 when they are aligned. Positioned on the opposite side of the shell body from the hinges 23 is a latch 25 for opening and closing the housing shell body.

The top shell half 2 is configured with air vents 28 at both a front end 6 and an opposing back end 7 to allow air to flow through the interior of the cargo box. The ventilation is desired to assist in the drying of any cargo or gear that gets wet during its use. The airflow through the cargo box is to be generated by the movement of the vehicle as it travels down the road, or through natural effects such as wind or convection currents.

Internally, the cargo box housing shell may have built therein, or attached to each respective shell half, one or more different compartments 10, 20 and fasteners 9 and 21. These compartments and fasteners are for use in securing the items being stowed, as well as aligning each item for maximum exposure to the airflow throughout the interior of the cargo box.

The cargo box A may be equipped with an automated vent closure door system 30 (see FIGS. 7a and 7b) at front and back ends 6 and 7, respectfully, of the housing shell for closing the air vents. This is done by moving control surfaces 32 into place to cover the air vents 28. The automated vent closure system senses precipitation such as rain or the like and moves the control surfaces into place, functioning as a seal or precipitation guard to ensure that no external moisture is allowed to reach the cargo through the air vents.

Attached to the interior walls of the cargo box there is optionally a set of germicidal wavelength, UVC lights 100. The UVC lights sterilize bacteria and neutralize mold growth on the surface of the items stowed, thus reducing odor and helping to minimize the potential of skin infections that could result from human contact with bacterial growth on the cargo.

Figure 3A:
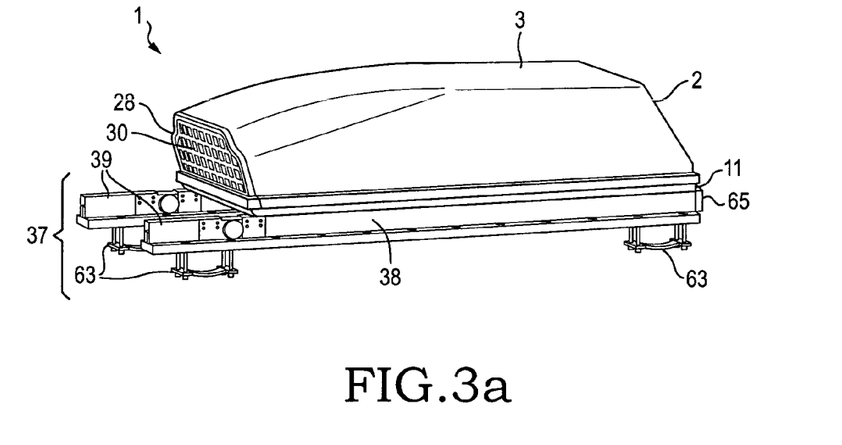
FIG. 3a is a perspective view of the Cargo Box in a first position where the housing shell body is directly above the rail arm tracks.
Figure 3B:
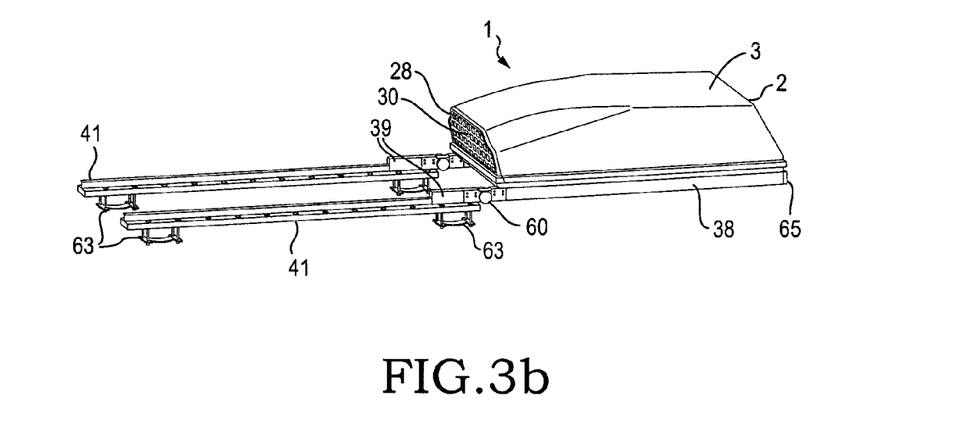
FIG. 3b is a perspective view of the Cargo Box in a second position where the housing shell body is extended backwards beyond the rail arm tracks.
Figure 3C:
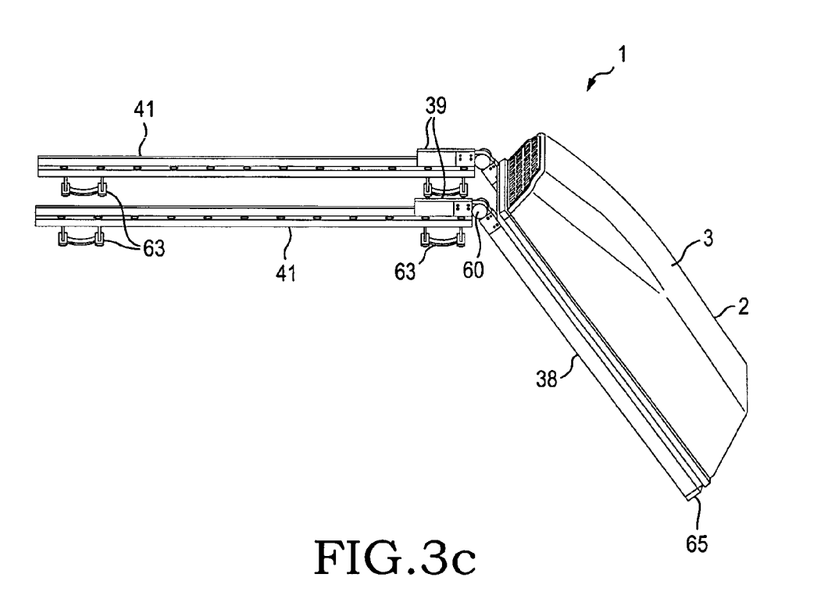
FIG. 3c is a perspective view of the Cargo Box in a third position where the housing shell body is tipped downward relative to the plain of the rail arm tracks.

Referring to FIGS. 3a-3c, the housing shell body 1 is attached to a system of rails 37 that allow the housing shell body 1 to be slid into various positions on top of (FIG. 3a) position 1, and behind (FIGS. 3b and 3c), positions 2 and 3, the vehicle that the cargo box is attached to. This railing system enables the housing shell body 1 to slide/roll back to the rear of the vehicle. Once in this position, utilizing a set of spring loaded hinges 60, the housing shell body is allowed to then slowly fold down to position 3 shown in FIG. 3c for ease of access to its contents at the rear end of the vehicle.

This racking system is engaged by releasing a locking mechanism 62 or a release handle, preferably at the back end of the cargo box (see FIG. 1). Once the locking mechanism is released, a set of latches is disengaged along the rails and the cargo box is then free to roll back and drop into its lowered position FIG. 3c. Once the desired cargo has been removed or re-stored in the cargo box, and access to the interior is no longer needed, the housing shell body 1 can easily (with the assistance of the spring loaded hinges) be raised back up to position 2 shown in FIG. 3b, and slid into locking position 1 as shown in FIG. 3a atop the vehicle.

Housing Shell Body:

Top and Bottom Shell Halves:

The top and bottom shell halves, 2 and 11 respectively, are preferably constructed of ABS plastic. However, they can be made of any durable, formable material that can be molded or shaped into the desired shape. Construction materials may be, but are not limited to hard plastics, fiberglass, aluminum or sheet metal(s).

The top shell half 2 has top 3, left 4 and right 5 sides, as well as a front end 6, and rear end 7. The top shell half is open on a bottom portion thereof and the opening is defined by a bottom edge rim 8. The individual surfaces may be concave or convex in their construction planes, or contain any arrangement of curves, creases or any other designable shapes that can be built into the construction materials.

The top, left and right sides as well as the front and back ends of the upper shell half can be integral or connected by filleted, chamfered or butted edges and may be oriented at angles ranging from 45 to 135 degrees to one another. The overall dimensions of the upper shell can range from two to ten feet in length, one to five feet in width, and six inches to three feet in depth. The shells thickness will range from $\frac{1}{32}$ of an inch up to $\frac{3}{4}$ of an inch depending on the rigidity of the construction material.

As shown in FIG. 2a, both the front end 6 and rear end 7 of the upper shell half have air vents 28 that are cut out of or molded into the upper shell half 2 (to be referred to as a port(s)). Each port 28 should be contained within the edges of the specific end's surface geometry but will not be limited to this. The ports will follow the contours of their respective end's surface geometry but may also be of any geometric shape.

Located along one of the two side surfaces of the top shell half is a small hole cut into the surface. This small hole is designed to match for alignment and installation purposes, with a locking/latching mechanism 25 such as a cam lock that will lock the top shell half to the bottom shell half.

The top shell half 2 is attached to the bottom shell shelf via a set of hinges 23.

The bottom shell half 11 has a bottom side 12, left 14 and right 15 sides, as well as a front 16, and rear end 17. These surfaces together will form five sides of an open box with on upward facing opening defined by an upper edge rim 18 for receiving gear. The individual surfaces may be concave or convex in their construction planes, or contain any arrangement of curves, creases or any other designable shapes that can be built into the construction materials.

The five surfaces of the bottom shell half can be connected by filleted, chamfered or butted edges and may be oriented at angles ranging from 45 to 135 degrees to one another. The overall dimensions of the bottom shell can range from two to ten feet in length, one to five feet in width, and one inch to three feet in depth.

Formed into the outside of the bottom surface of the bottom shell half are two grooves 19 or channels that run parallel to one another along the length of the bottom shell half 11 (see FIG. 2b). These two grooves serve as guide channels for the attachment of the railing system, to the underside of the bottom shell half 11.

The two channels are approximately one to six inches in width, with a depth ranging from $\frac{1}{16}^{th}$ of an inch up to three inches and preferably run the entire dimensional length of the bottom shell half.

Located along the corresponding side surfaces to the top shell half is a small hole cut into the surface. This small hole is designed to match with and be complimentary to the interior half of the locking/latching mechanism such as the cam lock that will lock the top shell half to the bottom shell half, mentioned herein.

The upper edge rim 18 of the bottom shell half 11 is designed such that, when the top shell half is aligned with the bottom shell half, the bottom shell's rim fits uniformly within the boundaries of the top shell's rim. This creates an overlap that prevents water from seeping into the bottom shell half. There may be a gap of $\frac{1}{16}^{th}$ of an inch up to one inch between the respective edges of each shell's rims when the two are aligned properly.

Vent Closure Components:

The invention includes one or more components to close the vents of the top shell half. They include vent closure doors to keep moisture out, anti-theft covers and debris screens. The following is a description of each component.

Vent Closure Doors:

The purpose of the vent closure doors 30 within the design assembly is to seal or block each vent 28 in the event that outside precipitation is encountered during use. The vent closure doors can be a number of different designs so long as they close the vents.

Figure 6:
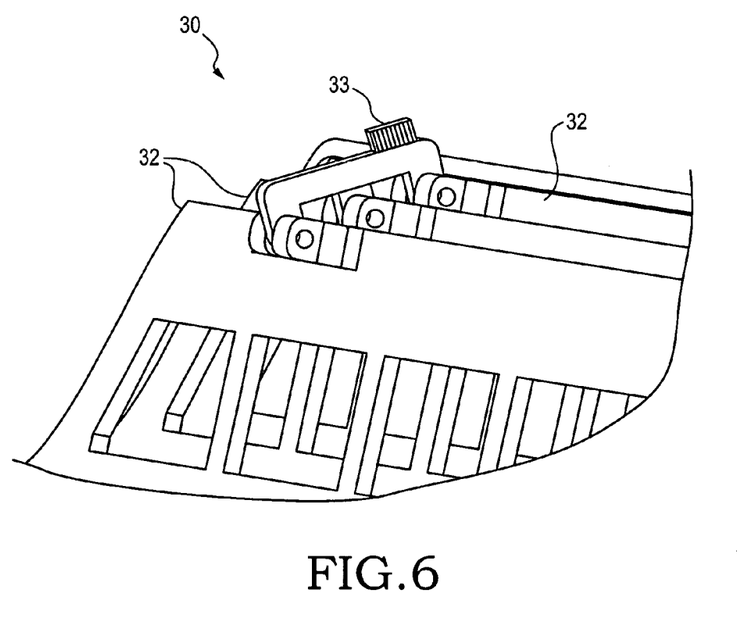
FIG. 6 is a perspective view of the vent closure doors according to one embodiment of the invention.
Figure 7A:
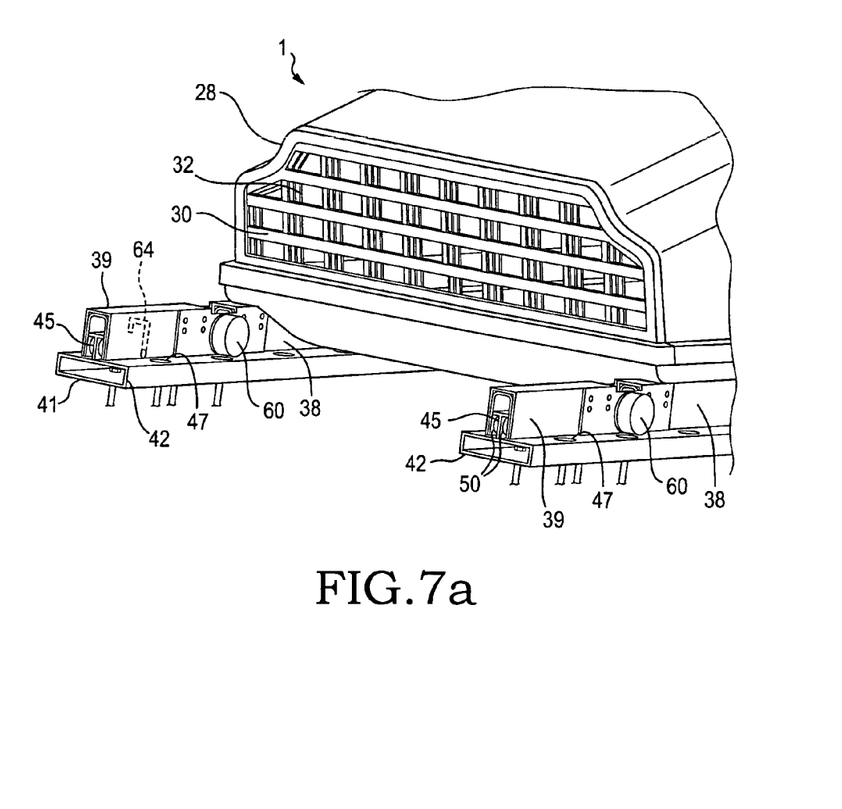
FIG. 7a is a perspective view of the vent closure door where the control surfaces are in an opened position.
Figure 7B:
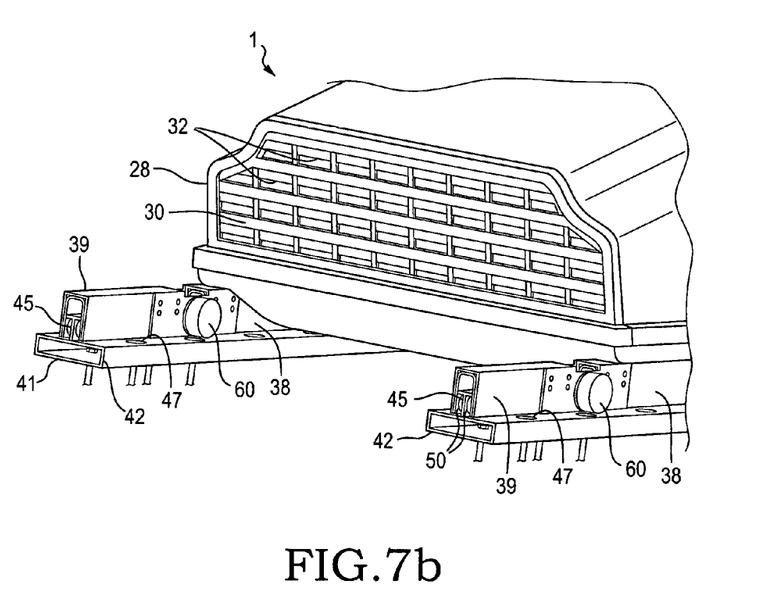
FIG. 7b is a perspective view of the vent closure door where the control surfaces are in a closed position.

The preferred vent closure door is a control surface 32 as shown in FIG. 6. The control surface has a first metal sheet that defines a plurality of openings and a second metal sheet that defines a plurality of openings. The sheets are layered on top of each other. In a first position, as shown in FIG. 7b, the layered sheets create a solid water impenetrable surface. In a second position, one of the sheets is moved relative to the other sheet so that the openings are lined up to permit air to flow through both sheets (FIG. 7a). Similarly a method used for sealing each vent 28 is to move one or more control surfaces of the vent closure doors to a position such that they close both the front and rear vents 28. Each individual perforated sheet is made of any ridged yet still ductile material such as hard plastics, resins or sheet metals.

Each vent closure door as a whole has one or more sets of control surfaces attached to the top shell half in the vicinity of the ports 28. The specific geometry of the vent closure door is such that when each control surface is moved into a position covering the vent, they will overlap one another creating one flat, solid surface. This flat surface will effectively shield the entire opening of each respective vent in the top shell.

The control surfaces can be multiple surfaces aligned with one another so that when moved into place they overlap in front of each vent. Each set of vent closure doors spans the height and width of the port in the closed positions.

The control surfaces of the vent closure doors themselves are designed as a flat surface that will move into place by either, swinging, folding or sliding, and have dimensions of one to five feet in length, one to thirty six inches in width and $\frac{1}{32}$ to 1 inch thick.

The movement of the vent closure doors at each end of the shell in ether the one or multiple control surface scenarios may be done manually or may be controlled by electronic components 33 such as sensors, motors, servos or actuators etc. (FIG. 6)

If the vent closure doors are to be controlled by electronics, the electronic components 33 can be a computer chip or timing circuit that receives a signal from a moisture sensor attached to the exterior of the top shell half or bottom shell half or some portion of the cargo box. The chip will then send a control signal to the motor or servo telling it which position to orient the control surfaces. This system is powered by either the vehicle battery or by an independent power source that is mounted to the housing shell body 1.

Other possible embodiments for closing the ports include one or more vent closure doors that are aligned on a set of tracks. The tracks permit the vent closure doors(s) to slide into place over the openings of each port much like the operation of a garage door.

Anti-Theft Cover:

In one embodiment there is included in the invention an anti-theft type cover. The purpose of the anti-theft cover within the design assembly is to prevent the removal of any stowed item through the front and rear ports.

The anti-theft type cover is a prefabricated grid or grate such as a diamond pattern grating or any other such patterned grating that can be made of either hard plastics or metals.

The anti-theft type covers 34 or debris screen 35 are designed to cover the entire opening of each vent and contour to the port's geometry. The edges of each anti-theft type covers extends ⅛ of an inch up to two inches past the edges of the ported openings. This extension is desired so that each anti-theft type cover can be securely mounted to the top shell.

The anti-theft type covers are secured to the inside or outside of the top shell's vents in a manner that only allows it to be removed with access to the interior of the housing shell body. This may be done by using a 1/16 of an inch to ½ inch screw, rivet, bracket, or bolt and nut combo in the case of a semi-permanent mounting method, and welding or gluing as a permanent method.

Other embodiments for anti-theft covers include a configuration of bars or rods that are attached in a similar fashion.

Debris Screen:

The purpose of the debris screen 35 within the design assembly is to completely cover each vent with a screen designed to keep smaller debris or bugs from entering the interior of the cargo box when the upper and lower shell halves are closed.

The screen may be modeled after any typical household window screening, and may be made of any plastic or rust resistant metal.

Each debris screen will span the entire opening of each port in the upper shell half, and will extend 1/16 of an inch to two inches beyond the perimeter of the ports opening for attachment purposes.

The debris screen is affixed to each vent. This may be accomplished, for example, by having its excess or extended material securely wedged between the anti-theft port cover and the cargo box itself. This may be done by using a 1/16 of an inch to ½ inch screw, rivet, bracket, or bolt and nut combo.

Gear Storage

Garment Storage Apparatus:

The purpose of the garment storage apparatus 10 within the cargo box is to hold sports gear, jerseys, shorts or any other garments within a breathable compartment in the top shell half 2. This allows air to flow around the gear or garments and promotes drying.

The garment storage apparatus can be made of, but is not limited to, any breathable mesh or netting that may or may not have elastic properties. It may also be a rigid or semi rigid container with the proviso that the container has multiple openings for permitting air to flow there through.

A method of storing a garment has the steps of securing a garment inside of the garment storage apparatus or strapping a garment inside of the top shell half 2 with securing straps 9. The securing straps are affixed to an interior surface of the top side of the top shell half. The garment storage apparatus may be sufficiently large so as to span the length and width of the interior of the top surface of the top shell half.

The garment storage apparatus is secured to the top shell half in one or more locations along its sides and ends. This may be done by using a 1/16 of an inch to ½ inch screws, rivets, or bolt and nut combos, straps or any number of methods of fastening that allow for semi-permanent attachment. It will be situated between the left and right sides of the top shell and in between the front end and the rear end.

Gear Storage Compartments:

The purpose of the internal gear storage compartments 20 within the design assembly is to hold items in place while allowing adequate airflow in and around the objects being stowed within the compartment. The airflow around the items helps to dry items that may have become wet prior to being stowed.

The compartments are constructed of a flexible, breathable material such as nylon mesh. They can be in the form of mesh bags. Alternatively, the compartments can be constructed of any material that permits airflow directly to their contents. They may be a rigid box with air channels or openings. In the case of mesh bag compartments, the openings of the compartments are lined with elastic cord or straps that allow the opening to be drawn shut to keep the items securely inside.

Several internal storage compartments 20 are located in the interior of the bottom shell half. Each compartment 20 is designed to secure stowed items so that they do not shift while the vehicle is in motion.

The compartments may vary in size from 1 to 36 inches in width, 1 to 36 inches in length and 1 to 36 inches in depth.

The placement of the compartments may be anywhere along the base of the bottom shell along the interior of the bottom surface. Each individual compartment is secured to the bottom shell half in one or more locations along its sides and ends. This may be done by using a 1/16 of an inch to ½ inch screw, rivet, bracket, or bolt and nut combo.

Gear Securing Straps:

The purpose of the gear securing straps 21 within the design assembly is to secure larger items in place while allowing adequate airflow in and around the objects being stowed.

The straps 21 are constructed of a flexible elastic material such as elastic cord, but may also be a non-elastic cording such as nylon straps or a combination of both. Located in the interior of the bottom shell are several securing straps 21. At each end of the straps is an apparatus meant to secure the strap to the inside of the bottom shell half by means of a hook and loop, button, snap, clip or any other method of semi-permanent attachment. These attachments will, in each case, have a corresponding or mating component that will be secured to any of the lower shell's interior surfaces. Each securing strap may vary from 10 inches, to upwards of 82 inches in length, and will be equipped with a clasp 22 or bracket allowing the strap to be lengthened or shortened to a desired length.

Germicidal UVC Bulb:

The purpose of the Germicidal UVC light system is to emit light within the ultra violet C or germicidal range, in order to kill off surface bacterial and mold.

As shown in FIG. 1, located along the inside surface of the top shell half 2, preferably, both the right and left sides of the top shell half, is a UVC light source 100. The light source is a UVC bulb or multiple bulbs angled so that they emit light into the interior of the upper and lower shells when the shells are closed together.

The UVC bulbs emit a spectrum of light within the ultra violet germicidal range between a wavelength of 254 (nm) and 280 (nm). Each bulb is mounted to the inside surface of the top shell half by a bracket, secured to the surface itself by ether bolts, screws, rivets, glue or epoxy.

The bulbs are situated along the sides of the top shell half at a distance of one to thirty six inches from the bottom edge of the side surface, and at any point along the length of the side.

The bulbs 100 are controlled by either a computer chip or a timing circuit. The control unit or chip 203 receives a signal from an external sensor 101 such as a contact sensor or proximity sensor.

This system also operates as a dead man switch, that is to say when the top shell half is opened, the sensor sends a signal to a control circuit that tells the system to turn off the bulbs. This feature is a safety feature designed to prevent direct human contact with the UVC light being emitted within the housing shell body.

Shell to Shell Hinges:

The purpose of the shell to shell hinges 23 within the design assembly is to attach both the top and bottom shell halves to one another. The hinge or set of hinges permits the top shell half to fold open or closed in relation to the bottom shell half.

The hinges themselves may be made of any durable rust resistant material such as stainless steel or any hard plastic.

The hinges are located along the edge of each shell's respective rim and serve to align the shells when closed. The hinges may number from one to upwards of six within the design of the invention. If one single hinge is used, the hinge should span the length of the hinge mounting side of the shell's rim so as to secure the shell from any undesired torque that the open half of the shell may encounter when opened and closed. In the case of using two hinges, the hinges will be positioned at opposing ends of the hinge mounting side of the shell's rim. In the case of implementing three or more hinges they should be aligned equidistant from one another along the length of the mounting side of the shells rim.

The hinges may be locking or spring loaded so that when the housing shell body is opened, the hinges arrest the movement of the open upper shell half in order to keep the housing shell body from swinging back shut on itself. The hinges are preferably 1 to 84 inches in length and are secured to the shell body by means of screws, bolts or epoxies and glues.

Railing/Racking System:

The cargo box has a railing/racking system 37 for attaching the housing shell body 1 to a vehicle, not shown. The railing/racking system has essentially three basic parts, a primary rail arm, a secondary rail arm and a rail arm track. These parts will be described in more detail as follows:

Rail Arm:

The purpose of each primary rail arm section 38 within the design is to attach the housing shell body 1 to the rail arm track 41. The primary rail arms hold roller brackets 49 therein (See FIG. 4). The roller brackets hold the primary rail arm to the rail arm track and guide. This configuration permits the housing shell body that is attached to the primary rail arm to move linearly along the railing system's rail arm track 41. The roller brackets are mounted inside of the U shaped cross section of the rail.

The second main function of the primary rail arm is to allow the housing shell body to fold down off the back end of the vehicle it's attached to (FIG. 3c). This is done through the use of hinges 60 that attach the primary rail arm to a secondary rail arm 39.

The primary rail arm is a sliding and extending member of the rail system and is located outside of the main housing shell body 1, and as such, is exposed to the elements and moisture. The primary rail arm is preferably made of a durable rust resistant metal such as aluminum or stainless steel, or any metal that has been coated with moisture and rust resistant coating.

Figure 4:
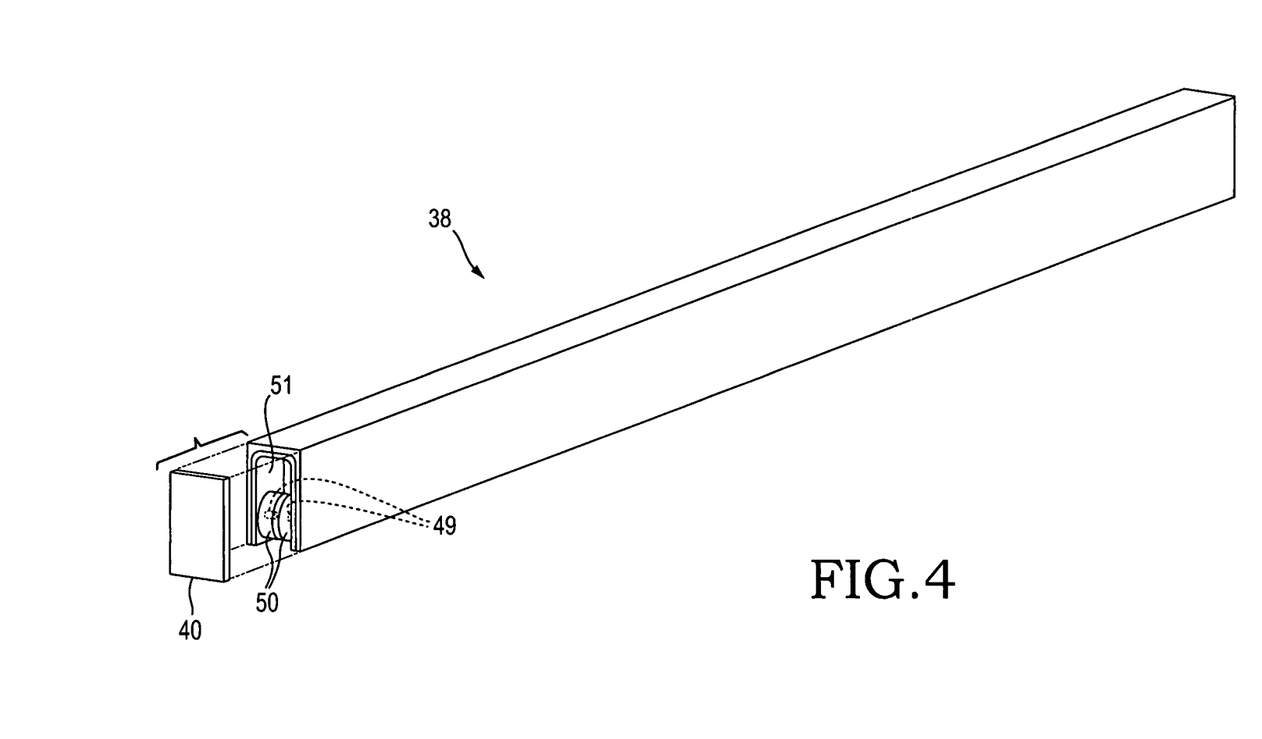
FIG. 4 is a perspective view of the primary rail arm.

As shown in FIG. 4, the primary rail arm has top, left and right sides. These three sides have a generally square u-shaped cross section with the arrangement in an open downward direction. The individual sides may be concave or convex in their construction planes, or contain any arrangement of curves, creases or any other designable shapes that can be formed into the construction materials.

The three main sides of the primary rail arm can be connected by filleted, chamfered or butted edges and may be oriented at angles ranging from 45 to 135 degrees to one another. The three sides of the railing system are from 1 to 6 inches in width, 12 to 100 inches in length and $\frac{1}{32}^{th}$ of an inch to $\frac{3}{4}$ of an inch in thickness. All the dimensions of thickness are uniform throughout the cross section.

There may be one or more primary rail arms. However, there are preferably two primary rail arms in the assembly mounted in an orientation that is parallel to each other. Each is attached to the outside of the bottom side 12 of the bottom shell half 11. Each of the primary rail arms 38 are complimentary with and designed to fit within the grooves 19 on the outside of the bottom side 12 of the bottom shell half 11.

The primary rail arm is secured to the bottom shell half in one or more locations along the rail arm's top and side surfaces. This may be done by using a $\frac{1}{16}$ of an inch to $\frac{1}{2}$ inch screws, rivets, or bolt and nut combos.

There are preferably two primary rail arm sections within the final railing system. Each individual primary rail arm is attached to a secondary rail arm 39 via heavy duty spring loaded rail hinges 60.

Secondary Rail Arm:

The purpose of each of the secondary rail arms 39 within the design are to attach to the primary rail arms 38 by a set of rail arm hinges 60 as well as to the rail arm track 41 through a set of roller brackets 49, similar to the roller bracket design of the primary rail arm shown in FIG. 4. The secondary rail arms 39 remain connected to the rail arm track 41 and allow the housing shell body 1 attached to the primary rail arm 38 to fold down into its partial or substantially vertical position via the set of rail arm hinges 60.

The secondary rail arm is a sliding/rolling member of the rail system and is located outside of the housing shell body, and as such, it is exposed to the elements and moisture. The secondary rail arm is made of a durable rust resistant metal such as aluminum or stainless steel, or any metal that has been coated with moisture and rust resistant coating.

The secondary rail arm has three sides: a top side, and left and right sides. These three sides have a square u shape cross section with the arrangement in an open downward direction similar to the primary rail arms. These individual sides may be concave or convex in their construction planes, or contain any arrangement of curves, creases or any other designable shapes that can be built into the construction materials.

The three sides of the secondary rail arm can be connected by filleted, chamfered or butted edges and their construction planes may be oriented at angles ranging from 45 to 135 degrees to one another. The three sides of the railing system are 1 to 6 inches in width, 4 to 36 inches in length, and $\frac{1}{32}^{th}$ of an inch to $\frac{3}{4}$ of an inch in thickness. The secondary rail arm has the same or substantially the same cross sectional dimensions as the primary rail arm.

There are preferably two secondary rail arms in the final assembly. The secondary rail arms are not directly attached to the lower shell half. The secondary rail arms are connected to the rail arm track 41 of the railing system via a set of roller brackets mounted inside of the U shaped cross section of the secondary rail arm's three sides.

Guide Rail Track:

The rail arm track 41 serves as a fixed linear track along which the housing shell body 1 and primary and secondary rail arms can travel. The rail arm track is fixed to the vehicle's existing roof or roof rack via a set of mounting brackets 63.

The cargo box is fixed to the rail arm track through the combination of the primary and secondary rail arms discussed above and their attached roller brackets 49 and rollers 50.

The rail arm track 41 is a fixed external member of the rail system, and, as such, it is exposed to the elements and moisture. The rail arm track is preferably made of a durable rust resistant metal such as aluminum or stainless steel, or any metal that has been coated with moisture and rust resistant coating.

Figure 5A:
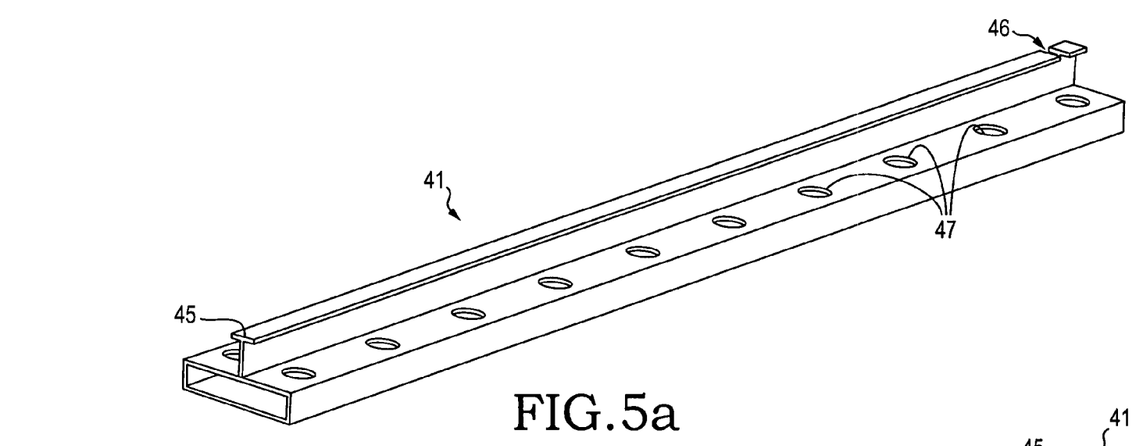
FIG. 5a is a perspective view of the rail arm track.
Figure 5B:
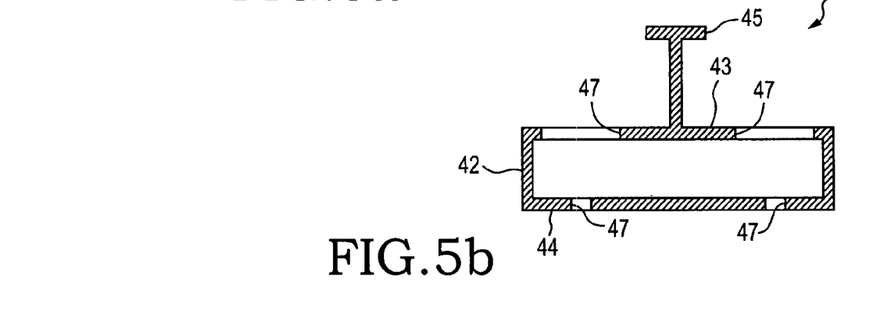
FIG. 5b is a cross section view of the rail arm track.

In a preferred embodiment, as shown in FIGS. 5a and 5b, the rail arm track's cross sectional design has a combination of two basic shapes. At its base, the cross section has an elongated rectangular shape 42. The rectangle portion 42 is oriented so that its two longer sides run horizontally. Rising from the center of the top side 43 of the rectangle is a "T" shaped formation 45 that functions to hold the rail arm track to the roller brackets 49 of the primary and secondary rail arms. The exact cross-sectional design of the guide rail track may vary so long as it is complimentarily received by the first and secondary rail arms in such a manner as to securely allow the rail arms to slide along its entire length. For example, it may have a cross-sectional "I" shape.

The cross sectional dimensions of the rail arm track are as follows. The rectangular section 42 has a width of 1 to 6 inches, a height of ¼ to 4 inches and is 24 to 120 inches in length, and the sides are $1/16^{th}$ of an inch to ¾ of an inch in thickness. The "T" section 45 extends up from the surface of the rectangle ¼ of an inch up to 3 inches and the "T" head ranges from ¼ of an inch to 3 inches wide. The entire length of the "T" section matches the length of the rectangular section it is integral with or attached to.

Both the rectangle and "T" cross sections are preferably manufactured as one unit. The T formation runs the length of the rail arm track dividing the rectangle into two symmetrical halves. Running down each half of this division are two separate parallel linear patterns of holes 47 drilled into the lower surface 44 of the rectangular section.

In an embodiment where the rectangular section is hollow and has an upper and lower portion, the linear holes are defined in both the upper and lower portions.

The lower set of linear patterned holes has a diameter of 1/16 to ¾ of an inch and are drilled out of the lower surface of the rectangle so that the rectangular section defines the holes. The first hole in the linear pattern should preferably be located on center 1.5 to 5 inches from the end and ⅜ of an inch to 1¼ of an inch from the right side. All the remaining holes in the pattern are preferably spaced 4 inches on center from one another down the length of the rail arm track. The lower pattern of holes on the lower surface of the rectangle mirror the first pattern's dimensions using the center of the base of the "T" section for a mirror line.

The upper set of linear patterned holes 47 all have a diameter of ¼ of an inch to 1 inch and are drilled out of the upper surface of the rectangle. The first hole in the linear pattern is located on center 1.5 to 5 inches from the end and ⅜ of an inch to 1¼ of an inch from the right side. All the remaining holes in the pattern are spaced 4 inches on center from one another down the length of the guide rail. The lower pattern of holes on the opposite half of the rectangle mirror the first patterns dimensions using the center of the base of the "T" section for a mirror line.

All of the holes in the linear pattern on both the upper and lower sides line up concentrically with one another so that the mounting bolt may pass through both an upper and lower hole. The two sets of holes will serve as mounting holes for bolts used to attach to the vehicle mounting brackets.

In another embodiment, the rectangular section is solid and the holes 47 run all the way through it.

As shown in FIG. 5a, cut into the rear end of the length of the T section is a notch 46. This notch extends down into the T shaped track starting from the outside of the T head and extends ⅛ to 1 inch inward. The notch serves as a hooking component for the railing systems latching mechanism. Other types of physical stopping features that have the function of preventing the secondary rail arm from rolling off the rail arm track are also envisioned.

Spring Loaded Hinges:

The purpose of the spring loaded rail hinges 60 within the design are to allow the primary rail arm to hinge away from secondary rail arm in a swinging motion as shown in FIG. 3c. The hinge allows the primary rail arm to fold downward from a collinear relation to secondary rail arm into a position relatively perpendicular to it. During the movement of each rail arm the spring of the hinge provides resistance against the movement of the primary rail arm in the downward direction and assistance to the motion when folding back upward into its original position.

The spring loaded rail hinge is preferably constructed out of an extremely strong material that is able to support the weight of the housing shell body and any stowed cargo. The suggested construction material may be any rust resistant metal or metal coated with rust resistant coatings as well as any extremely strong plastics or resins. The spring loaded rail hinges are mounted externally or within the "U" shaped cross section of the upper primary and secondary rail arms. They may be secured to any face of the rail arm sections as long as the hinge is aligned to allow the rail arms to fold apart while keeping the plane of the side surfaces of each rail arm parallel to one another. Each hinge is mounted to the respective rail arms by ether epoxies, screws or a bolt and nut combination.

Rail Arm End Caps:

Each of the rail arms has end caps 40 shown in FIG. 4. The purpose of the rail arm end caps within the design assembly is to completely cover the ends of each rail arm component. Covering each end of the rail arms in the railing system prevents debris from becoming lodged in the internal components of the railing system 37.

The rail arm end caps 40 are an external component of the railing system and as such they will be exposed to the elements. The rail arm end caps may be made of any durable plastics or resins suitable for long-term outdoor exposure. Each end cap is complimentary in shape and design to the geometry of the cross section of the railing system when fully assembled to fully close the ends of the rail arms.

The end caps may be attached to the rail arms by ether glue, epoxy, friction fit or any other method of attachment.

Bumper:

The purpose of the bumper 65 within the design assembly is to prevent the primary rail arms from coming into contact with the rear end of the vehicle. As shown in FIG. 1, the bumper 65 extends out past the plane between the two parallel rail arm sections 38 and 39.

The bumper is made of rubber, soft plastic or a rubber like material that is softer than any surface of the exterior of the vehicle. This material property is desired so that when the bumper makes contact with the vehicle, it does not leave scratches or marks on the surface where contact is made.

There may be one or more bumpers within the design assembly. The bumper(s) may be of any geometric shape but, will have a surface that will be designed to make contact with the vehicle in one or more places. The bumper(s) may range in size from 1/16 of an inch to 48 inches long, 1/16 of an inch to 48 inches wide and 1/16 of an inch to 12 inches thick.

The bumper itself may be attached to any of the underside surfaces of the main shell body or the side or end surfaces of one or both the primary rail arms.

Roller Brackets:

The purpose of the roller brackets 49 within the design assembly is to securely hold the rollers 50 that will make contact with the rail arm track 41. Through the bracket and rollers the primary and secondary rail arms mount to the rail arm track allowing the cargo box to roll linearly along the rail arm track.

The roller bracket is made of a durable rust resistant material such as any kind of ridged plastics, resins, or lightweight metal. The bracket is designed to fit inside both primary and secondary rail arms. The roller bracket defines a channel 51 in the rail arms for receiving the protruding T-section of the rail arm track. The general shape of the channel is complimentary to the shape of the T-section of the rail arm track.

The number of roller brackets and rollers within the design assembly can number from 4 to 60. Each bracket is mounted inside of each of the primary and secondary rail arms.

Roller Wheel:

The roller wheel is shown in FIG. 4. The purpose of each roller wheel 50 within the design assembly is to enable the roller bracket to roll along the rail arm tracks.

Each roller wheel 50 is positioned on the roller bracket so that the wheels are pressed firmly against the rail arm track. Because of the contact that the wheel makes with the track, the wheel is constructed of a durable rubber or plastic material that enables the roller wheel to be deformed regularly without permanent plastic deformation of the wheel's original shape. Suggested materials for construction may be but are not limited to polyurethane or phenolic resin.

The roller wheel is substantially disc shaped with a diameter of ¼ to 4 inches and a thickness of ¼ to 2 inches. Each roller wheel, when mounted within its corresponding bracket, is positioned so that it makes contact tangentially with the rail arm track. The roller wheels are oriented so that their axes of rotation are perpendicular to the extending length of the rail arm track. The roller wheels are mounted to the bracket so that they can turn freely.

Release Handle:

The purpose of the release handle 62 within the design assembly is to provide a handhold at the rear end of the cargo box's housing shell body 1. This release handle houses an apparatus that, for example, engages and disengages a set of latches, locking the cargo box's railing system 37 into place. The purpose of the release handle is to release the housing shell body 1 so that it can roll along the rail arm track into one of its various positions shown in FIGS. 3a-3c.

The handle is an exterior component of the inventions design and, as such, is constructed of any durable, rust resistant material such as hard plastics and metals. In one embodiment, the handle has a main body that extends out from its center in one direction. This main body serves as a loop of material contoured to fit the grip of a person's hand. Located on the loop is a release button that can be depressed by the user when the handle is gripped. This release button releases a set of latches attached to the inside surface of the primary and secondary rail arms via a cable or mechanical mechanism. When the latching mechanisms are released the housing shell body is able to roll backwards and extend out off of the rear of the vehicle or over the vehicle trunk.

Stopper:

The purpose of the stopper 64 within the design assembly is to keep the railing system components from sliding apart from one another, unless desired by the operator (FIG. 7a).

The stopper is constructed of any rust resistant rigid material such as hard plastics or metals.

The stopper attached to the rail's arms is modeled after a simple hook that is designed to sink into the notch 46 (FIG. 4) on the rail arm track "T" shaped track 45. In the instance where the stopper is a hook, it can be spring loaded so that it moves back into its locking position automatically.

The hook stopper 64 is mounted through an axis to one of the inside surfaces of the primary and secondary rail arms so that it may swing up or down into its locked and unlocked positions.

Railing to Vehicle Mounting Brackets:

The purpose of the railing to vehicle mounting bracket 63 within the design assembly is to removably attach the rail arm track 41 to the existing roof rack or roof of the vehicle.

Many different types of mounting brackets are contemplated with the proviso that they securely attach the rail arm track to the upper portion of a vehicle or to the vehicle's top rack.

In one embodiment, each vehicle mounting bracket 63 is made up of the three main components: a worm, worm wheel arm, and worm drive yoke. The three components will be discussed individually and their assembled functionality will be discussed in the following paragraphs.

Worm:

The purpose of the worm within the mounting bracket assembly is to drive the worm wheel arm, raising and lowering it into a desired position.

The worm will be constructed of any type of metal such as steel or any other material that is extremely strong and rigid. The worm will have two ends, each configured as a cylinder. The first cylinder will be the drive end. The drive end will have the length of its cylinder extending ⅛ to 1½ of an inch, with a diameter of ¼ to 1 inch. Set into this cylinder will be a series of channel cuts. Each cut will run parallel with the worm's cylindrical axes. Each channel cut will be centered along that same axis and be ¹⁄₆₄ to ¼ of an inch wide and ¹⁄₆₄ to ¼ of an inch deep.

The second side of the worm will be the gear end. The gear end of the worm will have a screw pattern set into the exterior surface of the cylinder as would be found on any typical worm. The threading of the screw will match up with the teeth on the worm wheel arm. The gear end of the worm will be ¼ to 2 inches in diameter and will extend ½ to 4 inches in length.

The worm will have a hole running through its center along its rotational axis that extends from the gear end up through the worm. This hole can be from ¼ of an inch long all the way to the full length of the worm. The hole will serve to keep the worm aligned within the worm drive yoke.

Worm Wheel Arm:

The purpose of the worm wheel arm within the mounting bracket assembly is to clamp down on the rails of the vehicle's existing roof rack in order to secure the cargo box atop the vehicle.

The worm wheel arm will be an exposed component of the assembly and, as such, will be made of a rust resistant metal such as stainless machine steel or any other material that is extremely strong and rigid.

The worm wheel arm will consist of two main sections. The first section will be the gear wheel. The gear wheel will be a circular section with a ⅛ to 1 inch hole at its center. Aligned concentrically around this center hole will be a set of gear teeth. These teeth will span 90° to 270° around the wheel. The teeth of the worm wheel's gear section will be designed to mesh with the screw threads of the worm.

The second section of the worm wheel arm will be the arm extension. The arm will extend from the gear wheel such that the top surface of the arm and the circumference of the gear wheel are tangent to one another. The arm will extend away from the gears center line from 1 to 9 inches and will be ¼ to 4 inches wide and have a thickness of ¼ to 2 inches. At the end of the arm's extension the arm will bend at an angle of 20° to 160° for a length of ¼ to 1½ inches.

The bend in the arm will act as a hook that can be positioned around the rails of the vehicle's existing roof rack in order to secure the invention from shifting forward or backward atop the vehicle.

Worm Drive Yoke:

The purpose of the worm drive yoke within the bracket assembly is to hold the worm and worm wheel arm in a position so that the screw of the worm meshes with the gear teeth of the worm wheel arm. The secondary purpose of the worm drive yoke is to serve as a mount for the entire bracket assembly to the underside of the guide rail track. The worm drive yoke will be made of a durable rust resistant material such as aluminum block or any hard plastic or resin.

The worm drive yoke will be a block with six sides. Each side will be connected by filleted, chamfered or butted edges and may be oriented at angles ranging from 45 to 135 degrees to one another. The yoke will support the worm wheel arm within a grove cut into the center of the yoke's right side. The groove will be 1/16 to 2 inches wide and up to 3½ inches deep. This groove will create the two arms of the yoke that will support the worm wheel arm on either side of the gear wheel section.

The worm wheel arm will be mounted within the yoke by using a pin and hole attachment method that allows the worm wheel arm to swivel within the yoke. The hole will perpendicularly intersect the groove that is cut into the yoke's right side and will be situated ¼ to 3 inches from the top surface of the yoke and ½ to 3 inches from the right side surface of the yoke.

The worm will be mounted in a hole that is set into the top surface of the yoke. The mounting hole will have an interior pin that will protrude up through the center of the hole. The pin will be designed as a male component with its female component being the hole that is bored into the end of the worm's shaft. This pin and hole arrangement will allow the worm to rotate on its central axis.

The mounting hole will intersect the groove in the yoke allowing a section of the groove to be open through a length of the hole's wall. This opening will allow the screw threads of the worm to make contact with the teeth of the worm wheel arm.

Electronic Systems:

Top to Bottom Shell Sensor:

The purpose of the top to bottom shell sensor 200 within the design assembly is to detect whether or not the cargo box's housing shell body is open or closed. This sensor can be any device that can send a signal to the control chip 203, such as a pressure switch or magnetic proximity sensor. The sensor will draw power from the power source outlined below and should be connected to a power supply.

Electrical Power Supply:

The purpose of the electrical power supply 201 within the design assembly is to supply the proper voltage and amperage of electricity to the control chip 203, sensors 202, UVC lights 100, and servos 204. The power needed to run all the electrical components within the design can come from an independent power supply such as solar, wind, or battery power device, mounted to or within the cargo box.

An alternative to the independent power supply is to use the vehicle's battery as the source of power for the operation of the electronic components.

Rain Sensor:

The purpose of the rain sensor 202 within the design assembly is to detect any precipitation that comes into contact with the sensor's surface during use.

Control Chip:

The purpose of the control chip 203 within the design assembly is to receive signals from the sensor(s). The control chip then determines the correct signal to send out to the servos controlling the control surfaces 32 of the vent closure doors 30.

Servos:

The purpose of the servos 204 within the design assembly is to receive a control signal, and orient the control surfaces 32 of the vent closure door 30, accordingly.

Circuit Assembly:

The rain sensor 202 is an electrical sensor. A rain drop will establish an electrical contact between the two configurations of positive and negative electrodes on the sensor's surface. Once this happens a signal is able to be sent through the completed circuit to the control chip. Once the rain sensor is tripped an internal timer will be initiated within the control chip and a signal will be sent to the servo controlling the control surfaces of the vent closure doors orienting them in the closed position. When the timer reaches an allotted time, the sensor will be set back into a standby mode, if the sensor is not tripped again within a brief timing period the control chip will send a signal reopening the control surfaces of the vent closure doors, keeping them in that position until the sensor is tripped again.

What is claimed is:

1. A vehicle roof cargo box for sanitary transport of gear comprising:
    a housing shell body, said housing shell body having an internal compartment, said housing shell body comprising,
        a first top shell half, and a second bottom shell half that is connected to said first shell half by one or more housing hinges; wherein said first top shell half has a plurality of air vents at opposing forward and rear ends thereof for permitting air flow through said compartment of said housing shell body, wherein said housing shell body further includes one or more UVC lights for killing surface bacteria and mold; and
    a railing system for holding said housing shell body to said vehicle, said railing system comprising:
        a linear rail arm track having a upward protruding T shaped member that has a substantially "T" cross section shape, said linear rail arm track for mounting to said vehicle,
        a primary rail arm attached to a bottom external surface of said bottom shell half of said housing shell body and oriented linearly between said forward end and said rear end of said bottom shell half, said primary rail arm having a shaped cross section facing downward for receiving and holding said T shaped member of said rail arm track and connecting to said rail arm track and permitting said primary rail arm and housing shell body to roll linearly along a length of said rail arm track and tilt downward off said track,
        a secondary rail arm, said secondary rail arm having a cross section facing downward for receiving said T shaped member of said rail arm track and connecting said secondary rail arm to said rail arm track and permitting said secondary rail arm to roll linearly along said rail arm track and remain on said track, said secondary rail arm connected to said primary rail arm with a rail arm hinge, wherein said primary rail arm can slide along said rail arm track to a second position off and tilting downward at said rail arm hinge from said secondary rail arm and wherein said secondary rail arm remains on said rail arm track.

2. The vehicle roof cargo box of claim 1, wherein said cargo box has two or more railing systems oriented in parallel relationship to each other, and oriented linearly between said forward end and said rear end of said bottom shell half.

3. The vehicle roof cargo box of claim 1, wherein said means for connecting said primary and secondary rail arms to said rail arm track comprise roller brackets and said rail arm track's "T" cross section shape holds said roller brackets to said rail arm track.

4. The vehicle roof cargo box of claim 1, further comprising vent closure doors for closing the vents to prevent moisture from entering said compartment.

5. The vehicle roof cargo box of claim 4, wherein said vent closure doors are automatically controlled by a moisture sensor that closes said doors when rain is sensed.

6. The vehicle roof cargo box of claim 4, wherein said vent closure doors are control surfaces comprising two or more perforated plates that move relative to each other so that in a first position, the perforations line up to permit air to flow through and in a second position the perforations do not line up preventing air from flowing through.

7. The vehicle roof cargo box of claim 1, further comprising a bracket for mounting said rail arm track to said vehicle.

8. The vehicle roof cargo box of claim 1, further comprising one or more of an anti-theft vent cover and/or debris screen vent cover.

9. The vehicle roof cargo box of claim 1, wherein said cargo box further comprises one or more of rain sensors, open and close sensors, motors, and/or servos.

10. The vehicle roof cargo box of claim 1, wherein said UVC lights are controlled by sensors that turn the lights on only when the housing shell body is in a closed position.

11. The vehicle roof cargo box of claim 1, wherein said housing shell body further comprises one or more of garment storage apparatuses, gear storage compartments, gear securing straps.

12. The vehicle roof cargo box of claim 11, wherein said garment storage apparatuses or gear storage compartments comprise mesh bags or containers that permit air to flow there through.

13. The vehicle roof cargo box of claim 1, wherein said housing shell body further comprising a latch opposite said housing hinges for securing said top shell half to said bottom shell half.

14. The vehicle roof cargo box of claim 1, wherein said secondary rail arm has a stopper for preventing said secondary rail arm from sliding off of an end of said rail arm track.

15. The vehicle roof cargo box of claim 1, wherein said primary rail arm has a bumper at an end opposite from said end that is connected to said rail arm hinge, said bumper for preventing said primary rail arm from damaging said vehicle.

16. The vehicle roof cargo box of claim 1, further comprising a release handle with a locking mechanism for locking said housing shell body over the top of said rail track in a first position and for releasing said housing shell body to move linearly along said rail arm track to a second position tilting off an end of said rail arm track.

17. A method of storing and drying gear on top of a vehicle comprising:
   inserting wet gear inside of said housing shell body of the cargo box of claim 1;
   closing said housing shell body;
   moving said vehicle so that air moves through said vents of said housing shell body, thereby drying said gear.

* * * * *